US010132922B2

United States Patent
Fericean et al.

(10) Patent No.: US 10,132,922 B2
(45) Date of Patent: Nov. 20, 2018

(54) PROXIMITY SENSOR AND METHOD FOR MEASURING THE DISTANCE FROM AN OBJECT

(71) Applicant: Balluff GmbH, Neuhausen a. d. F. (DE)

(72) Inventors: Sorin Fericean, Leonberg (DE); Mark Eberspaecher, Frickenhausen (DE)

(73) Assignee: Balluff GmbH, Neuhausen a. d. F. (DE)

( * ) Notice: Subject to any disclaimer, the term of this patent is extended or adjusted under 35 U.S.C. 154(b) by 449 days.

(21) Appl. No.: 14/895,012

(22) PCT Filed: Jul. 1, 2013

(86) PCT No.: PCT/DE2013/000342
§ 371 (c)(1),
(2) Date: Dec. 1, 2015

(87) PCT Pub. No.: WO2015/000452
PCT Pub. Date: Jan. 8, 2015

(65) Prior Publication Data
US 2016/0124083 A1    May 5, 2016

(51) Int. Cl.
| | | |
|---|---|---|
| *G01S 13/36* | (2006.01) | |
| *G01S 13/32* | (2006.01) | |
| *G01S 7/35* | (2006.01) | |

(52) U.S. Cl.
CPC ............. *G01S 13/36* (2013.01); *G01S 13/32* (2013.01); *G01S 2007/358* (2013.01)

(58) Field of Classification Search
CPC .................................. G01S 13/36; G01S 13/32
(Continued)

(56) References Cited

U.S. PATENT DOCUMENTS 6,445,191 B1   9/2002  Trummer
6,672,155 B2 *  1/2004  Muller ................. G01F 23/284
                                                    342/124
(Continued)

FOREIGN PATENT DOCUMENTS

CN       1 584 562 A      2/2005
CN     102224398 A       10/2011
(Continued)

OTHER PUBLICATIONS

A. Stelzer, C. G. Diskus, K. Lubke and H. W. Thim, "A microwave position sensor with submillimeter accuracy," in IEEE Transactions on Microwave Theory and Techniques, vol. 47, No. 12, pp. 2621-2624, Dec. 1999. (Year: 1999).*
(Continued)

*Primary Examiner* — Marcus E Windrich
(74) *Attorney, Agent, or Firm* — Collard & Roe, P.C.

(57) ABSTRACT

A proximity sensor for measuring the distance from an object contains a microwave oscillator providing, as an output signal, a transmission wave emitted toward the object as a free space transmission wave reflected by the object, the object being electrically conductive or having at least one electrically conductive surface, as a free space reflection wave and is received by the proximity sensor as a reflection wave. The reflection coefficient is determined from the transmission and reflection waves and is provided by the proximity sensor as a measure of the distance. The transmission wave is guided in a waveguide as a waveguide transmission wave and is injected into the waveguide with a wave mode which results in the waveguide transmission wave being separated at the aperture at the front end of the waveguide into the free space transmission wave and in the free space transmission wave propagating to the object.

27 Claims, 10 Drawing Sheets

(58) Field of Classification Search
USPC .................................................. 342/124, 127
See application file for complete search history.

(56) References Cited

U.S. PATENT DOCUMENTS

| | | | | |
|---|---|---|---|---|
| 7,319,401 | B2* | 1/2008 | Åkerstrom | G01F 23/284 340/612 |
| 7,518,548 | B2* | 4/2009 | Edvardsson | G01F 23/284 342/124 |
| 8,018,373 | B2 | 9/2011 | Edvardsson | |
| 8,040,274 | B2* | 10/2011 | Wendler | G01F 23/284 324/364 |
| 8,872,694 | B2* | 10/2014 | Edvardsson | G01F 23/284 342/124 |
| 2010/0090883 | A1* | 4/2010 | Chen | G01F 23/284 342/124 |
| 2013/0132005 | A1* | 5/2013 | Welle | G01F 23/284 702/55 |

FOREIGN PATENT DOCUMENTS

| | | |
|---|---|---|
| DE | 10 2010 009 664 A1 | 9/2011 |
| EP | 1 000 314 B1 | 4/2002 |
| EP | 2 527 804 A1 | 11/2012 |

OTHER PUBLICATIONS

C. Nguyen, S. Kim, Theory, "Analysis and Design of RF Interferometric Sensors", Springer-Verlag 2012 (Abstract).
International Search Report of PCT/DE2013/000342, dated Mar. 7, 2014.
Diskus et al., 35 GHz six-port receiver for radar applications, Part of the SPIE Conference on Subsurface Sensors and Applications, vol. 3752, Jul. 18, 1999, pp. 355-365.
Stelzer et al., A Microwave Position Sensor with Submillimeter Accuracy, IEEE Transactions on Microwave Theory and Techniques, vol. 47, No. 12, Dec. 1999, pp. 2621-2624.
Bonerz et al., Sensorsystem zur Überwachung der Werkzeugplananlage auf Basis von Keramikresonatoren and Hohlleiterstrukturen (Sensor system for monitoring the tool plan system on the basis of ceramic resonators and waveguide structures), ANSYS Conference and 29th CADFEM Users Meeting, Oct. 19-21, 2011, 9 pages.
T. F. Bechteler, The Groove-Guide Oscillator, IEEE Microwave Magazine, vol. 12, No. 6, pp. 110-119, Oct. 2011.
Chinese Office Action dated Dec. 5, 2016 in Chinese Application No. 201380074940.9.

* cited by examiner

PROXIMITY SENSOR AND METHOD FOR MEASURING THE DISTANCE FROM AN OBJECT

CROSS REFERENCE TO RELATED APPLICATIONS

This application is the National Stage of PCT/DE2013/000342 filed on Jul. 1, 2013, the disclosure of which is incorporated by reference. The international application under PCT article 21 (2) was not published in English.

The invention concerns a proximity sensor and a method for measuring the distance from an object according to the type of the independent claims.

PRIOR ART

A cylindrical distance measurement device is described in patent specification EP 1 000 314 B1 which is based on the determination of the resonance frequency of a cavity resonator. The resonator is formed from the resonator housing and the object to be detected. The physical resonator length is thereby composed of the length of the resonator housing and the distance to the object. If a minimum size of the object to be detected is exceeded, the resonance frequency is linked directly to the length of the resonator, from which the object distance can be concluded. The exact dependency between the resonator length and the resonance frequency depends on the present field distribution and therefore on the used waveguide wave mode. Here, the electric permittivity of the waveguide filling results as a decisive factor in the design. If this value increases, on the one hand both the construction length of the resonator and the required cross-section reduce, but on the other hand the range of the distance measurement device also decreases with increasing permittivity.

In the case of the described concept, a metallised dielectric is provided as a resonator rear wall, on which the evaluation electronics are located on the outer side. Either a coplanar slot coupling or a microstrip line is proposed for coupling the electronics to the resonator. The injection by means of the microstrip line is then above all helpful if the evaluation electronics are to be assembled detached from the resonator, for example for reasons of thermal decoupling. Additionally, either one or two coupling positions can be implemented depending on whether the resonator is used in the transmission or in the reflection operation.

To determine the resonance frequency, the evaluation electronics contain an adjustable oscillator, the frequency of which is linearly tuned to a certain bandwidth and the resulting reflection or transmission factor of the resonator is observed. In the setting of a resonance frequency, these factors have strong variations which can be recognised systematically by differentiating with respect to the frequency. Since circuitry-wise, a linear connection exists between frequency and time due to the control, the derivative with respect to the frequency can be obtained by means of a derivative with respect to the time. If the thus obtained second derivative exceeds a predetermined threshold, a resonance is recognised and the frequency is not detuned any further, but rather is kept constant and its current value is determined by means of a frequency counter.

As an alternative approach for frequency determination, in patent specification EP 1 000 314 B1, a concept is proposed on the basis of a closed phase-locked loop (PLL). Here, the nominal frequency is predetermined as a guide value of the PLL via a direct, digital synthesiser (DOS). If the detection circuit now recognises a resonance, the frequency is known directly by the adjustments of the digital synthesiser, whereby the cycle duration of a measurement can be clearly shortened.

Independently of how the resonance frequency is determined, with this resonator method, the fact that the distance range to be detected directly provides the required bandwidth of the operating frequency is disadvantageous. For industrial sensors, the usable bandwidth is provided fixedly and therefore also the distance range.

Irrespective of the admissible ISM bands (Industrial, Scientific and Medical Band), a frequency range for the operation of between 1-100 GHz is proposed, wherein the bandwidths should amount to approximately 2 GHz or 10% respectively. Additionally, it proves to be difficult to be able to implement large distance ranges with this resonator concept. The reason for this is, on the one hand, that in the case of distances which become larger, the changes in the resonance frequency become smaller. Additionally, the decreasing quality of the resonator leads only to weakly pronounced minima in the reflection or transmission factors, whereby the detection of the corresponding resonance frequencies is error-prone. This is evident if the position of the resonance frequency is demonstrated in the complex frequency plane. With decreasing quality, the complex eigen frequency is distanced from the ω-axis, whereby in the case of detuning of the oscillator, a singularity can no longer be traversed. The limited range is additionally caused by the selection of the used TE01 mode, as the field distribution has predominantly evanescent waves around the waveguide in this case, which subside quickly with increasing distance.

In the technical contribution by S. Bonerz, W. Bechteler, J. Greif, "Sensorsystem zur Überwachung der Werkzeugplananlage auf Basis von Keramikresonatoren and Hohleiterstrukturen" (Sensor system for monitoring the tool plan system on the basis of ceramic resonators and waveguide structures), ANSYS Conference and 29th CADFEM Users Meeting, 19-21 Oct. 2011, a method was presented in which the determination of a distance of an object from a distance sensor is likewise based on the basis of a waveguide resonator. Also here, the distance to be measured determines the length of a resonator and therefore the resonance frequency thereof. The used waveguide wave mode is here the basic mode TE11 of a circular cylindrical waveguide. The resonance frequency is determined by a frequency sweep by means of a measurement of the recorded effective power of the resonator.

In the technical contribution by T. F. Bechteler, A. S. A. Bechteler, "The Groove-Guide Oscillator," IEEE Microwave Magazine, Vol. 12, No. 6, Pages 110-119, October 2011, a distance measurement method is described on the basis of a so-called groove-guide oscillator, which likewise corresponds to a resonator concept. Although here the problem of the distance measurement is also ascribed to the determination of eigen frequencies of a resonator, this system fundamentally differs, however, both in the structure of the resonator and in the proposed determination of the resonance frequency, from the solution approach described in patent specification EP 1 000 314 B1. A groove-guide oscillator forms a core piece of the known distance sensor. In principle, in microwave technology, a groove-guide is understood to be a waveguide which contains two opposing plates into each of which a groove having a rectangular cross-section is introduced in the direction of propagation. The entire arrangement is symmetrical with regard to a plane, the normal of which coincides with the connection line of both plates. In the space which results due to the grooves and the conductive plates, wave modes which are capable of propagation in the direction of the groove can exist. Due to the required symmetry and the strong dependency of the propagation properties on the plate distance, this waveguide puts strict requirements on the production accuracy.

The production of an alternatively usable "semi-symmetrical" waveguide, in which one half of the arrangement is completely replaced by a conductive plane, is substantially simpler.

The dependency, which is present in the case of the described waveguides, of the propagation constants on the distance to the object is used for the determination of the distance. In this instance, for the implementation of a resonator, the groove is no longer introduced straight, but rather as a circle, so that a circular conductor loop results. A resonance then results exactly if an integer multiple of the guided wavelength corresponds especially to the conductor circumference. As the guided wavelength is a function of the plate distance and the frequency, the resonance condition can be fulfilled within a certain bandwidth for different distances and from this the information concerning the distance can be obtained.

The oscillator is stimulated by means of a Gunn element, whereby the oscillator oscillates to its eigen frequency. The frequency determination then occurs by a heterodyne system, in which the mixed-in eigen frequency is supplied to a frequency counter. Determined by design, the described distance sensor has a large construction size, since the diameter of the resonator must be selected to be proportionally large in order to keep the radiation losses in the radial direction small. The diameter of the described resonator amounts, for operation between 8-12 GHz, to 60 mm for a plate size of 200 mm×200 mm. The thus achieved measurement range extends from 13-15 mm. If the plate distance is further enlarged, higher wave modes can occur in the considered frequency range, whereby ambiguity results.

In patent specification DE 10 2010 009 664 A1, a distance sensor is described which, on the one hand, is used for monitoring the distance between a work spindle of a machine tool and the stationary part of the machine tool and, on the other hand, for controlling a tool plan system. Additionally, conclusions as to the rotational speed of the work spindle and the quality of the spindle bearing are possible.

The distance sensor contains a high frequency line which is connected to an oscillator and to a reflection measurement device. The position of the work spindle relative to the high frequency line influences the reflection behaviour, such that the distance can be concluded from the determined reflection factor. The high frequency line is, for example, implemented as a microstrip line which is manufactured from flexible material, which is fastened onto the surface of the stationary part of the machine tool by gluing.

A high-frequency transmission signal provided by an oscillator is injected into the high-frequency line. One part of the transmission signal is decoupled by a first directional coupler and is supplied to a first power detector. The predominant part of the transmission signal is fed into the high-frequency line after passing through a second directional coupler.

The reflection signal reflected by the object is superimposed by the transmission signal. A part of the reflection signal is decoupled by the second directional coupler and supplied to a second power detector. The two power detectors are connected to an evaluation unit which determines and emits the ratio of the two powers, i.e. the reflection factor, from which a measure for the distance of the object can be specified.

Additionally, a dielectric resonator can be provided which causes pronounced resonance behaviour of the distance sensor. A change in the distance of the object from the dielectric resonator causes, as a consequence, a shift of the resonance frequency of the dielectric resonance. The determination of the distance from the object can then additionally or alternatively be supported by the evaluation of the frequency change.

In the technical contribution by C. Nguyen, S. Kim, Theory, "Analysis and Design of RF Interferometric Sensors", Springer-Verlag 2012, an interferometric method for the operation of a distance sensor is described. To obtain the distance information, with this method, the phase shift between a transmitted signal and the received signal is evaluated. Here, distances between the distance sensor and the object which are larger than half of the wavelength of the signal can no longer be clearly recognised from the phasing. In the technical contribution it is proposed to obtain an unambiguous phase information by means of algorithms of the signal processing. However, it is necessary for this purpose that the object is moved from the original position to the position to be measured, while the phase is recorded continuously. An absolute measuring distance sensor can therefore not be implemented.

In the technical contribution by A. Stelzer et al "A Microwave Position Sensor with Submillimeter Accuracy", IEEE Transaction on Microwave Theory and Techniques, Vol. 47, No. 12, December 1999, a hybrid method is described in which the interferometric method is combined with known radar methods, for example the FMCW method (Frequency Modulation Continuous Wave). Although such a method again enables unambiguous distance determination, the method cannot readily be used in the industrial field to replace known inductive distance sensors. The main reason is that, typically, the minimum possible measurement distance is determined via the bandwidth of the operation frequency, such that it is not possible to measure up to position zero. Furthermore, applicable requirements relating to emissions of electromagnetic radiation must be observed. An operation is only possible within an ISM band, for which reason the bandwidth and the minimum distance resulting therefrom cannot be decided freely. For example, a minimum distance of 60 cm results for a standard system for the full use of the admissible bandwidth of 250 MHz of the ISM band at 24 GHz.

The object of the invention is to specify a proximity sensor and a method for measuring the distance from an object using a wide detection range which are moreover virtually independent of the permeability of the metallic object to be detected.

The object is solved by the features specified in the respective independent claims.

DISCLOSURE OF THE INVENTION

The invention is based on a proximity sensor for the measurement of the distance of an object from the proximity sensor. The proximity sensor contains a microwave oscillator which provides a transmission wave as an output signal which the proximity sensor emits in the direction of the object as a free space transmission wave which the object, which is electrically conductive or has at least a electrically conductive surface, reflects as a free space reflection wave and the proximity sensor receives as a reflection wave, wherein a determination of the reflection factor from the transmission wave and the reflection wave is provided, which the proximity sensor provides as a measure for the distance. The proximity sensor according to the invention is distinguished by the transmission wave being guided in a waveguide as a waveguide transmission wave, by the injection of the transmission wave into the waveguide having a wave mode, which leads to the separation of the waveguide transmission wave into the free space transmission wave at the aperture at the front end of the waveguide and to the propagation of the free space wave towards the object.

The proximity sensor according to the invention offers, compared to, for example, inductive proximity sensors, a considerably broader measurement range which can be greater by up to a factor of 10, as well as a greater linearity range.

With the proximity sensor according to the invention, for example, compared to a proximity sensor according to the standard radar principle which has a blind range from zero to a minimum distance as a matter of principle, very small distances in the range from zero to a few centimetres can be detected.

Compared to a proximity sensor which uses a characteristic resonance property, the partially time-consuming search for a resonance frequency is omitted and the bandwidth is independent of the distance measurement range, wherein a very thin-band operation or even an operation having the bandwidth of zero is possible.

Due to the omission of a modulation of the transmission wave and omission of the intermittent operation of the microwave oscillator, the proximity sensor according to the invention demands only a small high-frequency bandwidth. Therefore even the bandwidth of zero is possible. Therefore, the proximity sensor according to the invention observes the applicable EMV guidelines without a problem.

A further significant advantage of the proximity sensor according to the invention is that the measurement result is predominantly independent of the permeability of the object.

With a view to the production, it is advantageous for the proximity sensor according to the invention to be able to be implemented in standard construction forms of known inductive proximity sensors.

The embodiment of the proximity sensor according to the invention having a waveguide into which the injection of the transmission wave having a wave mode is provided, which leads to the separation of the waveguide transmission wave into a free space transmission wave at the aperture at the front end of the waveguide and to the propagation of the free space transmission wave towards the object, enables, on the one hand, the influencing of the propagation direction of the emitted free space transmission wave and, on the other hand, a provision of the transmission wave having a power which is as low as possible.

Advantageous embodiments and developments of the proximity sensor according to the invention are each the subject matter of dependent device claims.

A propagating free space transmission wave is achieved with the comparably simple stimulation of the TE11 mode of the waveguide transmission wave which is allocated to the circular waveguide.

The waveguide can in principle be designed to be rectangular or circular cylindrical. An advantageous embodiment provides that the waveguide is designed to be circular cylindrical. Therefore the proximity sensor according to the invention can be implemented using the present components of the known inductive proximity sensors in a cost-effective manner. Furthermore, a direct exchange of a conventional inductive sensor with the proximity sensor according to the invention is possible without changes having to be carried out to the measurement apparatus.

Another advantageous embodiment of the proximity sensor according to the invention provides that a dielectric window is provided at the aperture at the front end of the waveguide. The dielectric window prevents the entry of dirt into the waveguide. Alternatively or, in particular, additionally, the entire waveguide can be filled with a dielectric material. With this measure it is possible to fix a preferably present mode changer directly in the waveguide.

The injection of the transmission wave having its predetermined wave mode is achieved in the simplest manner using a mode changer which transcribes the line transmission wave into the waveguide transmission wave.

To determine a measure for the distance from the reflection factor, a quadrature mixer or alternatively the 6-gate technique (German: 6-Tor-Technik) can be used particularly advantageously due to the availability as completed technical solutions.

The method according to the invention for measuring the distance from an object, in which an output signal of a microwave oscillator is provided as a transmission wave which is emitted in the direction of the object as a free space transmission wave, which is reflected as a free space reflection wave by the object, which is electrically conductive or has at least one electrically conductive surface, and is received as a reflection wave, wherein the reflection factor is determined from the transmission wave and the reflection wave and is provided as a measure for the distance, is distinguished in that the transmission wave is guided in a waveguide as a waveguide transmission wave, that the injection of the transmission wave into the waveguide is carried out using a wave mode which leads to the separation of the waveguide transmission wave into the free space transmission wave at the aperture at the front end of the waveguide and to the propagation of the free space transmission wave towards the object.

The method according to the invention can alternatively also be referred to as a method for the operation of the proximity sensor according to the invention. Therefore, the advantages already presented with respect to the proximity sensor according to the invention are also present in the case of the method according to the invention.

Advantageous embodiments and developments of the method according to the invention for the measurement of the distance from an object are each the subject matter of dependent method claims.

Advantageously, the TE11 mode allocated to the circular waveguide is provided as a wave mode.

The method according to the invention enables the determination of the distance in the case of only one frequency of the transmission wave and only one predetermined wave mode.

An alternative or additional embodiment provides that, for the determination of the distance, a tuning of the microwave oscillator alternating to at least two different frequencies of the transmission wave is carried out. Therefore, the determination of the distance can be carried out in the case of at least two different frequencies of the transmission wave and in the case of one single wave mode.

One embodiment provides that at least one second wave mode is provided for the injection of the transmission wave into the waveguide to be alternating with respect to the first wave mode.

With this measure, according to another alternative or according to an additional embodiment, it is provided that the determination of the distance is carried out in the case of a single frequency of the transmission wave and at least in the case of two different wave modes.

In this embodiment, for example, at least one such further wave mode is provided which leads to a predominantly evanescent field distribution in front of the waveguide which clearly differs from the propagating free space transmission wave such that the difference is as great as possible. Particularly suitable for this is the TM01 mode which is allocated to the circular waveguide.

Using the described embodiments, the determination of the distance is possible in at least two different ways, such that the results determined in the different ways can be checked for plausibility and/or clarity can be produced.

A direct measure for the distance of the object from the aperture of the waveguide is obtained by means of a back calculation of the determined reflection factor from the transmission wave and the reflection wave for the reflection factor occurring at the aperture of the waveguide. The back calculation preferably occurs with a conformal mapping which is angle-preserving, such that the essential phase information is not lost.

Here, the measure for the distance can already be obtained solely from the phase of the reflection factor. Preferably, furthermore, the absolute value of the reflection factor is considered. In particular, an unambiguous determination of the distance from the phase of the reflection factor can then be obtained by means of the absolute value of the reflection factor if ambiguity of the phase of the reflection factor is present within the predetermined measurement range.

Advantageous developments provide, on the one hand, a rough calibration and if necessary, additionally, a fine calibration.

According to one embodiment, it can be provided that the distance is provided as an analogue signal.

Additionally or alternatively, it can be provided according to one embodiment that a switch signal is provided which signals that a determined distance has been exceeded or fallen below.

Further advantageous embodiments and developments of the proximity sensor according to the invention and the method according to the invention to measure the distance from an object arise from the following description.

Exemplary embodiments of the invention are depicted in the drawing and explained in more detail in the following description.

SHORT DESCRIPTION OF THE FIGURES

FIG. 2a shows a diagram of the electrical field strength in a cross-section of a waveguide during a first stimulation, FIG. 2b schematically shows a resulting field strength distribution in the waveguide and in the free field during a stimulation according to FIG. 2a;

Figure 3A:
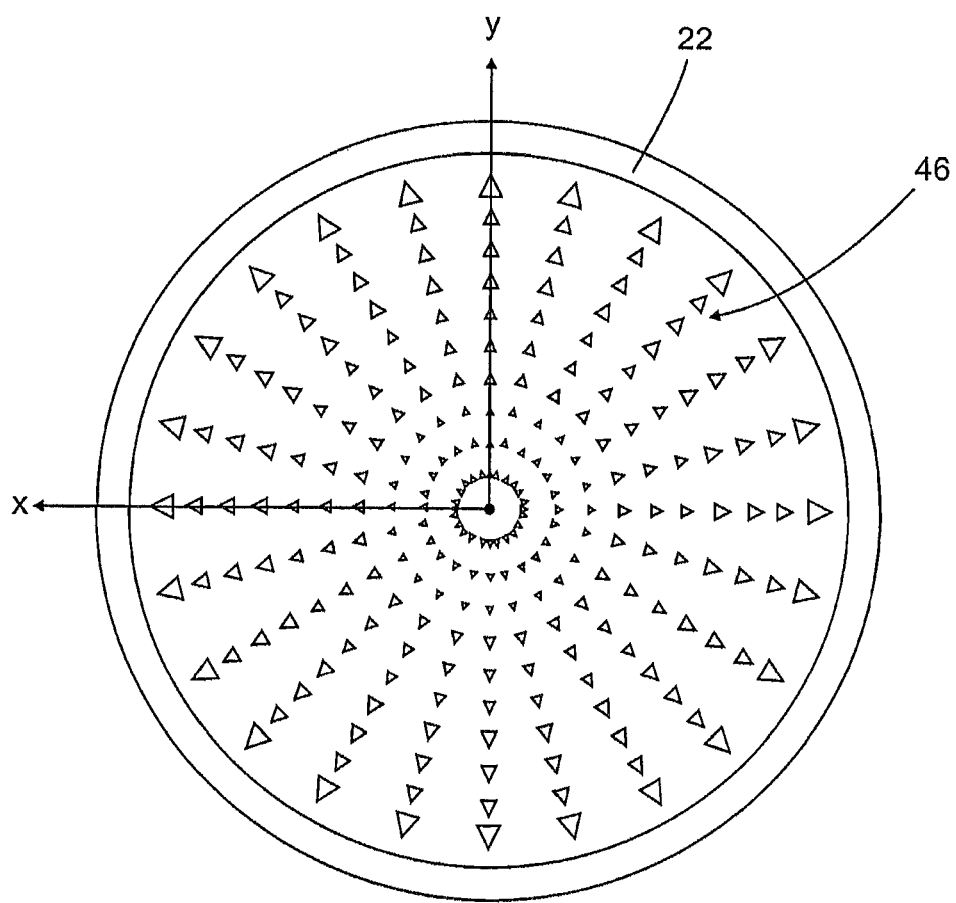
Figure 3B:
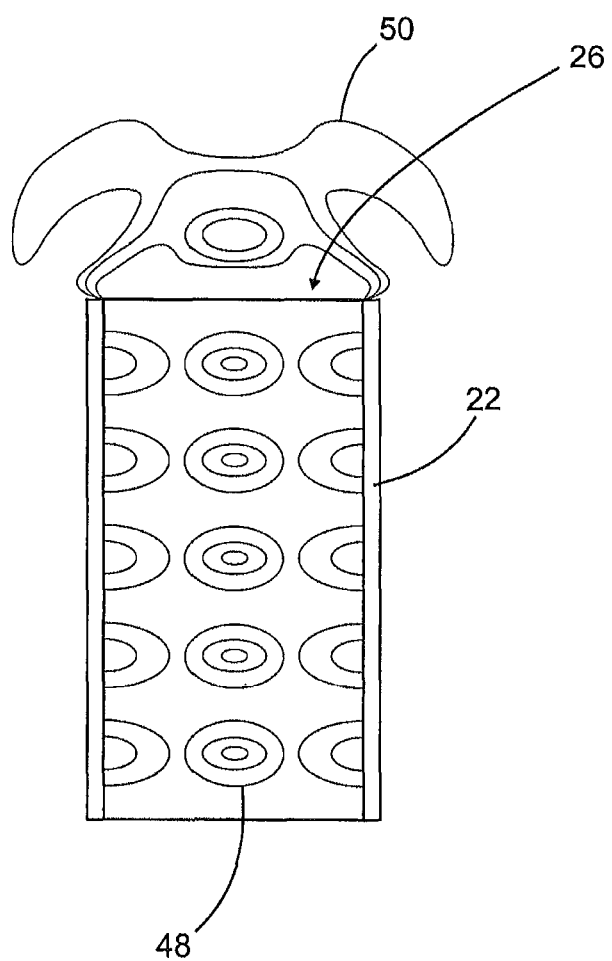
Figure 4A:
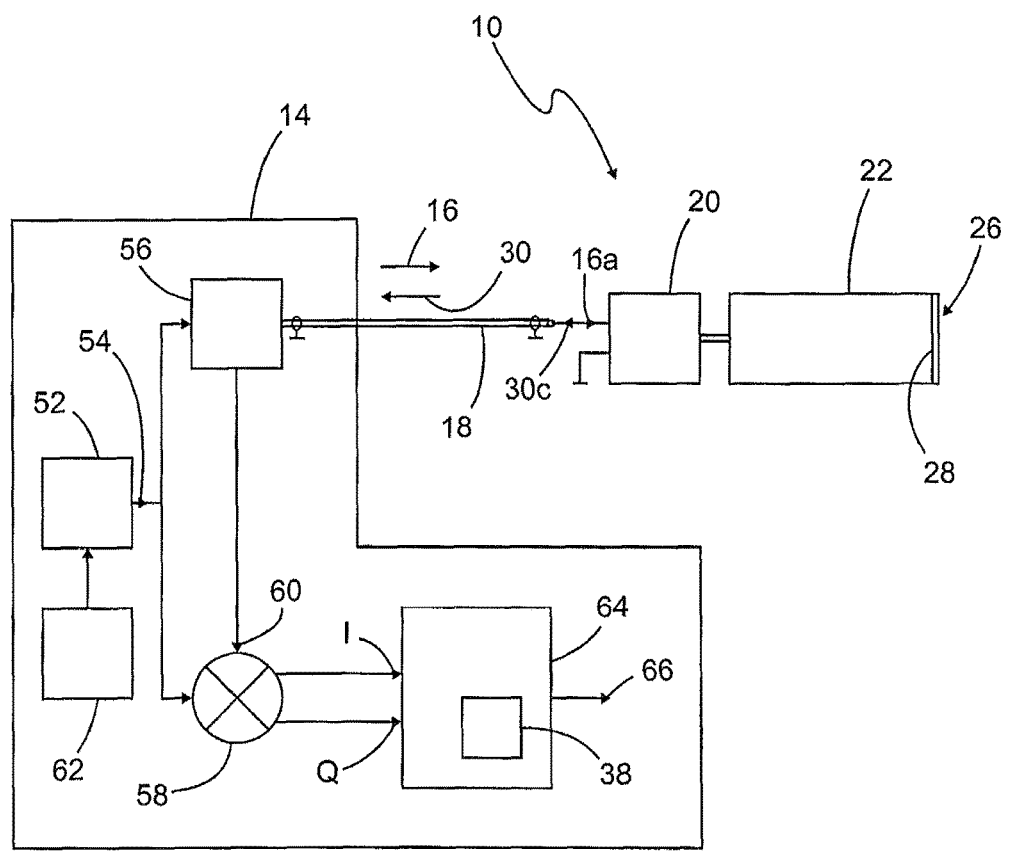
Figure 4B:
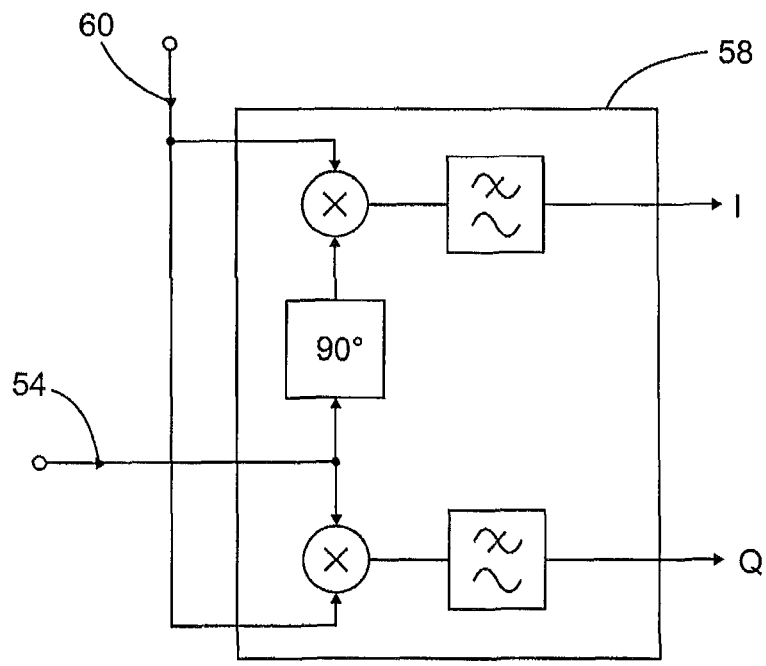
Figure 4C:
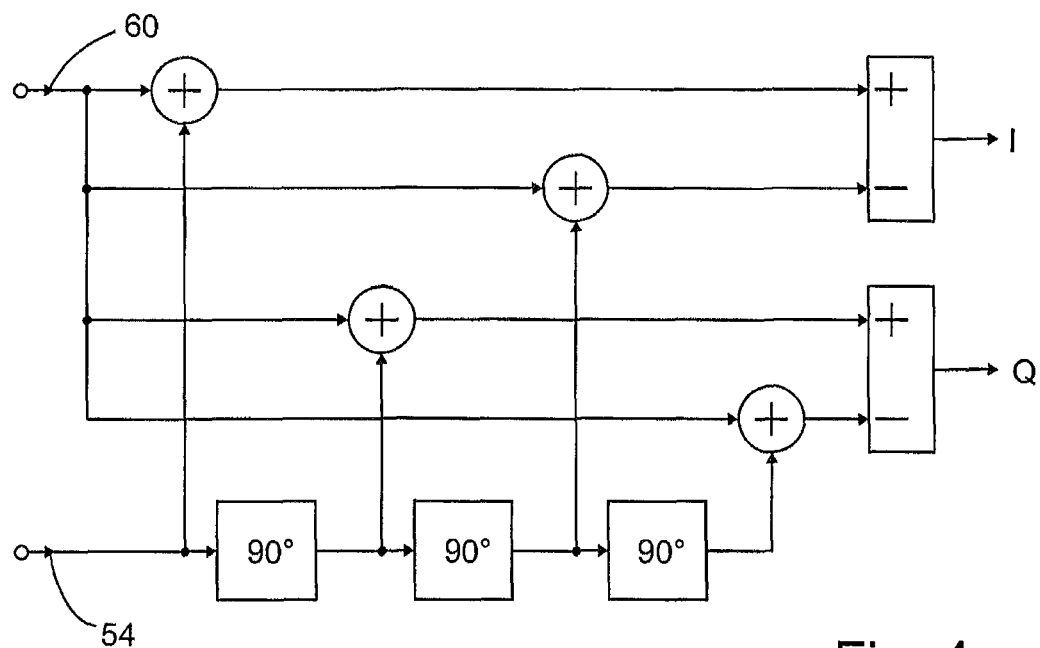
Figure 5A:
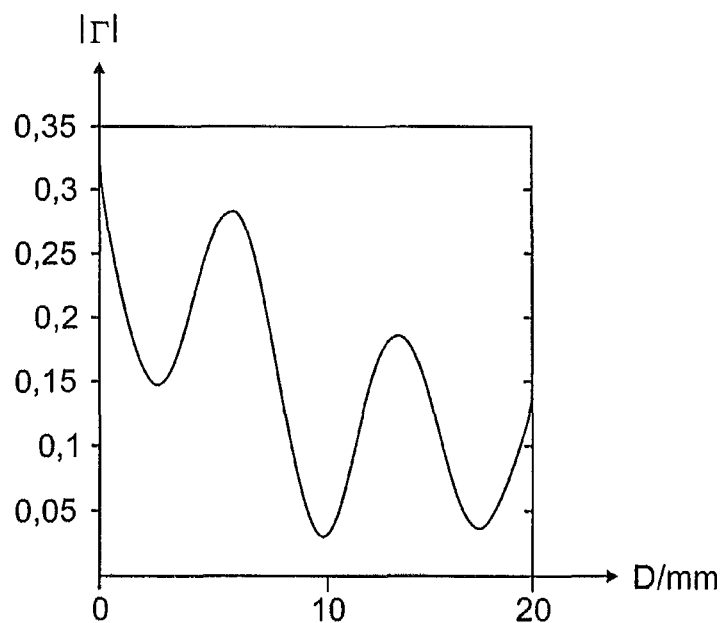
Figure 5B:
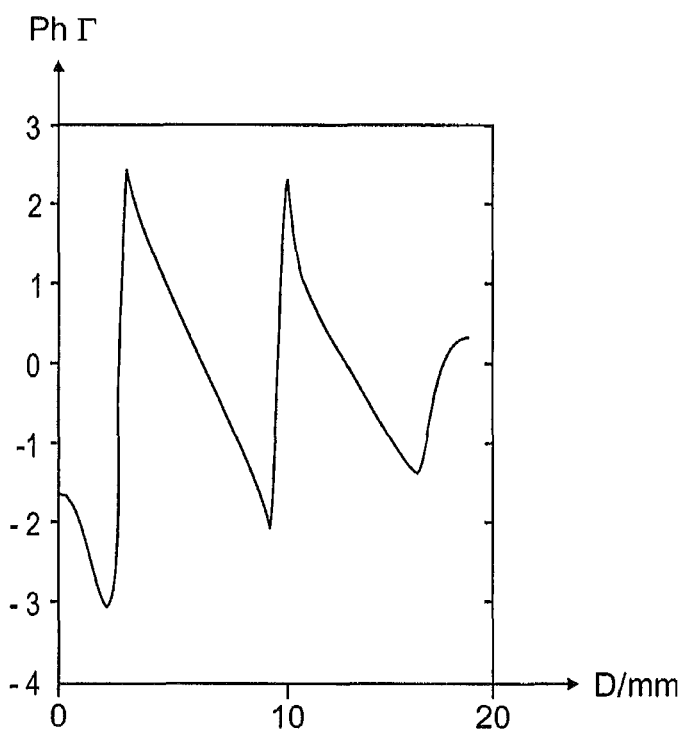
Figure 6A:
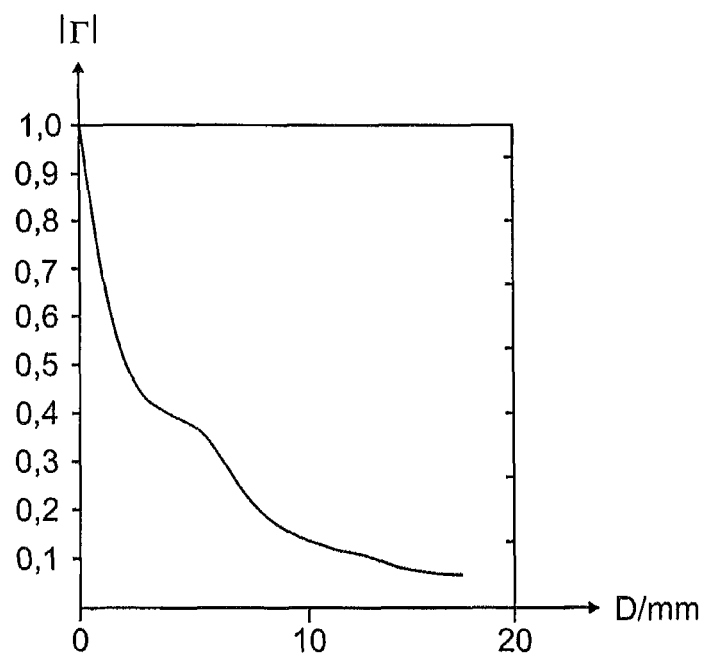
Figure 6B:
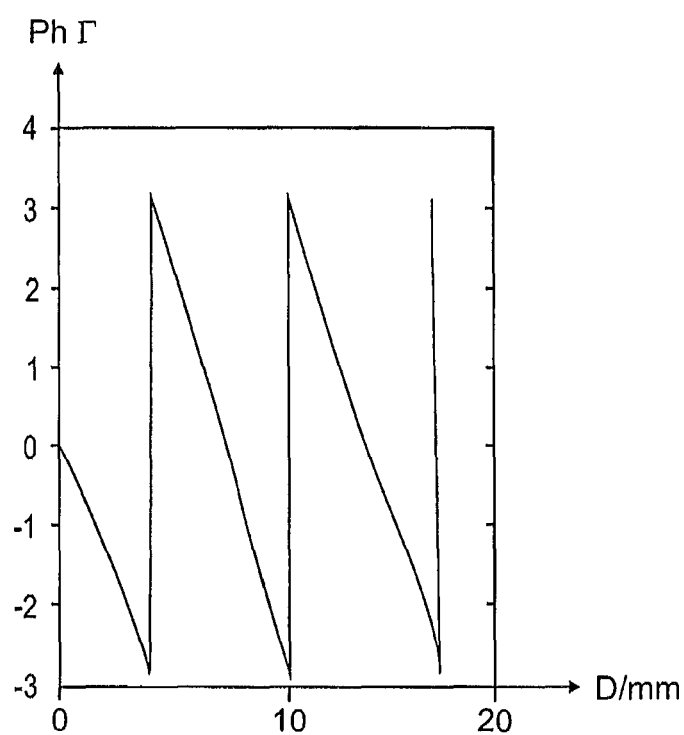
Figure 7:
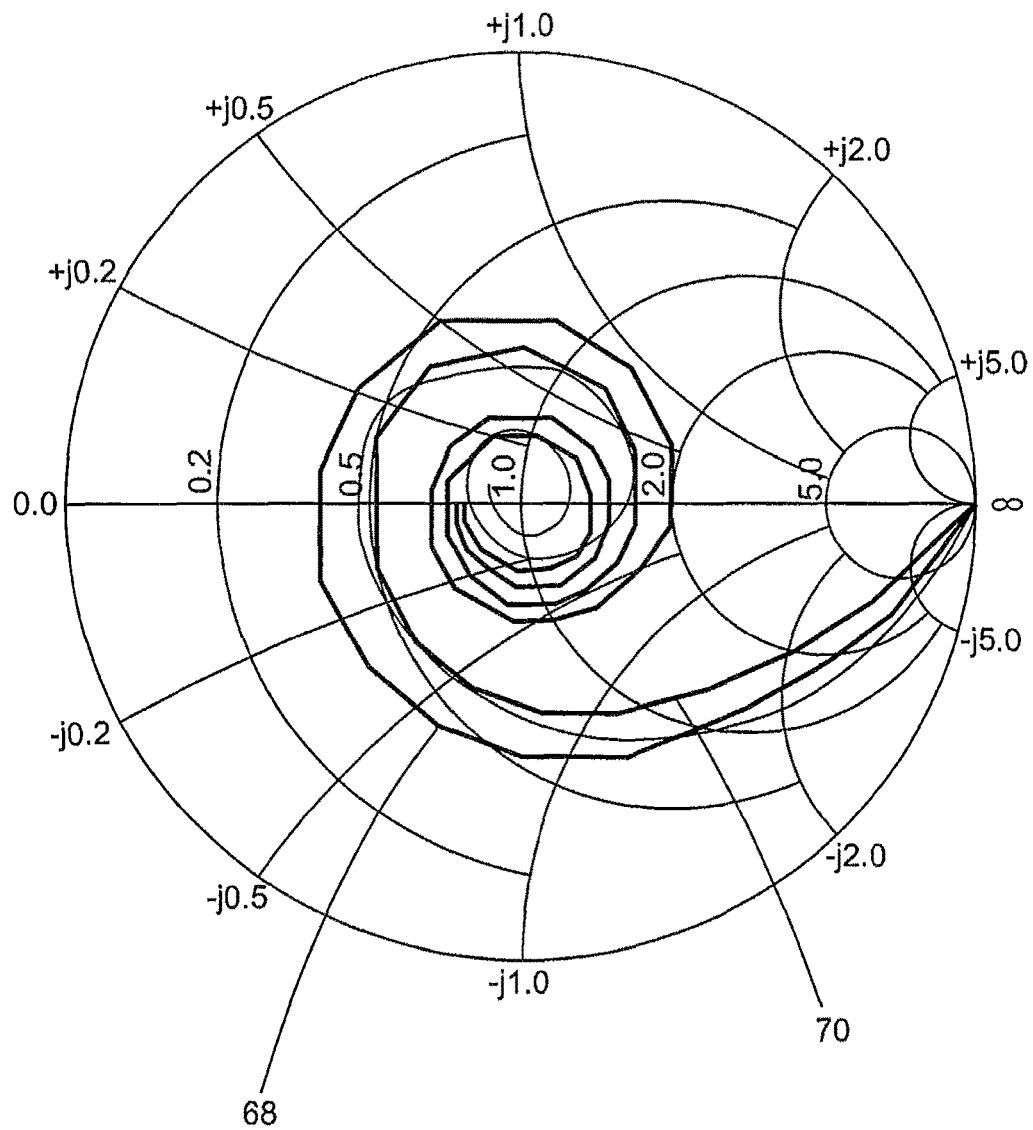

FIG. 3a shows a diagram of the electrical field strength in a cross-section of a waveguide during a second stimulation, FIG. 3b schematically shows a resulting field strength distribution in the waveguide and in the free field during a stimulation according to FIG. 3a, FIG. 4a shows a block diagram of a signal-processing system, FIG. 4b shows a block diagram of a quadrature mixer, FIG. 4c shows a block diagram of a 6-gate technique, FIG. 5a shows an absolute value of a measured complex reflection factor, FIG. 5b shows a phase angle of a measured complex reflection factor, FIG. 6a shows an absolute value of a measured complex reflection factor according to a conformal mapping, FIG. 6b shows a phase angle of a measured complex reflection factor according to a conformal mapping, and FIG. 7 shows a measured reflection factor in the case of two different frequencies according to a conformal mapping.

DETAILED DESCRIPTION OF THE EXEMPLARY EMBODIMENTS

Figure 1:
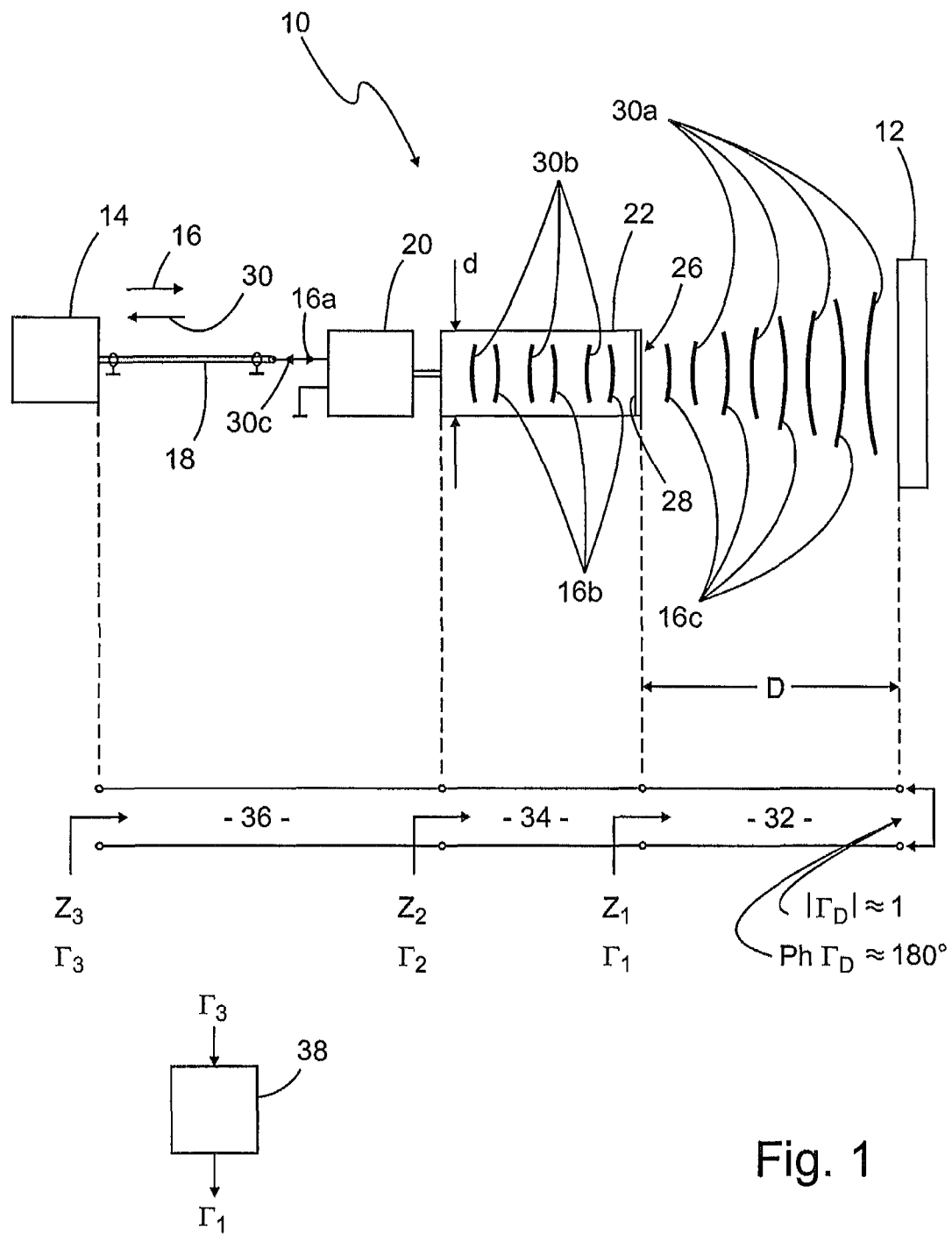
FIG. 1 shows an outline of a proximity sensor according to the invention.

FIG. 1 shows an outline of a proximity sensor 10 according to the invention which detects the distance D between the proximity sensor 10 and an object 12.

A signal-processing arrangement 14 provides a transmission wave 16 which is guided in a high-frequency line 18 as a line transmission wave 16a up to a mode changer 20. The mode changer 20, which transfers the line-bound two-wire wave mode (QTEM) of the line transmission wave 16a into a predetermined waveguide wave mode, injects the line transmission wave 16a into a waveguide 22.

The waveguide 22 has a predetermined cross-section which, for example, can be rectangular or circular cylindrical. If necessary, a circular cylindrical construction is advantageous, wherein a direct exchange of present inductive proximity sensors having circular cylindrical housings with the proximity sensor 10 according to the invention is possible in a simple manner. In particular, available mounts can be used.

The stimulated waveguide transmission wave 16b propagates in the waveguide 22, reaches an opening or aperture 26 at the front end of the waveguide 22 and determines the field distribution in the region of the aperture 26.

The waveguide transmission wave 16b which runs in the waveguide 22 and the wave fronts of which are outlined in FIG. 1, occurs at the aperture 26 of the waveguide 22 as an emitted dominating free space transmission wave 16c, of which the wave fronts are also outlined. The aperture 26 of the waveguide 22 corresponds to the active surface of the proximity sensor 10.

The waveguide 22 can have a dielectric window 28 at its aperture 26 at the front end. The dielectric window 28 prevents the introduction of dirt into the waveguide 22. Dielectric materials which have a transmission loss which is as low as possible for the waveguide transmission wave 16b are considered as a material for the dielectric window 28. Suitable materials are, for example, Teflon or aluminium oxide. Thereby the electrical permittivity of the material plays a role as a selection criterion as this value enters directly into the resulting wave resistance of the waveguide wave modes in addition to the diameter d.

The wave resistance $ZHL_{\varepsilon r}$ of a waveguide filled with dielectric results from the wave resistance $ZHL_{\varepsilon 0}$ of the unfilled waveguide:

$$ZHL_{\varepsilon r} = \frac{ZHL_{\varepsilon 0}}{\sqrt{\varepsilon r}}$$

In principle, the values should be determined in such a way that the characteristic wave resistance of the propagating mode of the waveguide transmission wave 16b corresponds to the wave resistance of the free space $Z_{F0} = 377\Omega$ in front of the waveguide 22. Thereby it is ensured that an anechoic transfer occurs from the waveguide transmission wave 16b to the emitted free space transmission wave 16c.

Alternatively or additionally to the embodiment having the dielectric window 28, the waveguide 22, if necessary including the mode changer 20, can be filled with the dielectric. This embodiment proves to be particularly advantageous because the mode changer 20 can hereby be fixed mechanically inside the waveguide 22. In FIG. 1, the embodiment is shown in which the mode changer 20, observed in the direction of the transmission wave 16, is positioned outside the waveguide 22 for reasons of depiction.

The emitted free space transmission wave 16c strikes the object 12 which is located at the determined distance D in front of the aperture 26 of the waveguide 22. The proximity sensor 10 according to the invention determines and provides a measure for the distance D between the aperture 26 of the waveguide 22 and the object 12.

The object 21 which is either produced completely from an electrically conductive material or has at least one surface made from an electrically conductive material reflects the free space transmission wave 16c which runs outside the waveguide 22 such that a reflection wave 30 occurs which is firstly present in the form of a free space reflection wave 30a, of which the wave fronts are outlined in FIG. 1. The free space reflection wave 30a arrives back in the waveguide 22 through the aperture 26, in which waveguide the reflection wave 30 is present as a waveguide reflection wave 30b, wherein the wave fronts of the waveguide reflection wave 30b are again outlined.

The waveguide reflection wave 30b is transferred in the mode changer 20 into a line reflection wave 30c and reaches into the signal-processing arrangement 14 as a reflection wave 30.

The entire arrangement between the signal-processing arrangement 14 and the object 12 can be considered in sections as a high-frequency line which is outlined schematically in the lower partial image of FIG. 1. An initial impedance $Z_1, Z_2, Z_3$ or a reflection factor $\Gamma_1, \Gamma_2, \Gamma_3$ can be allocated to each section respectively. Ideally, a bypass is present on the electrically conductive surface of the object 12 which leads to a value of the reflection factor $\Gamma D$ of at least approximately 1 and to a phase shift of the phase Ph $\Gamma D$ between the free space transmission wave 16c and the free space reflection wave 30a of at least approximately 180°.

A measure for the distance D can be determined by means of a measurement of the impedance $Z_1$ or of the reflection factor $\Gamma_1$ which is present at the aperture 26 of the waveguide 22. The phase Ph $\Gamma_1$ of the reflection factor $\Gamma_1$ represents an initially ambiguous measure for the distance D depending on the known frequency of the transmission wave 16.

In the shown exemplary embodiment, the first impedance $Z_1$ or the first reflection factor $\Gamma_1$ respectively occurs at the aperture 26 of the waveguide 22. Furthermore, one can proceed from the assumption that air is present in the free space, the wave resistance of which amounts to at least approximately 377 Ohm. Instead of air, however, another medium can also be provided, for example a dielectric wall, wherein the wave resistance then changes accordingly.

The direct measurement of the reflection factor $\Gamma$ at the aperture 26 of the waveguide 22, specifically as a measurement of the first reflection factor $\Gamma_1$, would technically be very costly. Therefore, preferably, the third reflection factor $\Gamma_3$ is measured at the beginning of the high-frequency line 18 at the position of the signal-processing arrangement 14.

The substantial advantage lies in that the measurement can be carried out within the signal-processing arrangement 14.

Theoretically in terms of the line, the entire arrangement between the signal-processing arrangement 14 and the object 12 can be depicted as a cascade of different line sections 32, 34, 36. The line sections 32, 34, 36 are formed by the free space which is dependent on the distance D, the waveguide 22 as well as the high-frequency line 18, ignoring the mode changer 20. Each line section 32, 34, 36 has a specific wave resistance, an (initial) impedance $Z_1, Z_2, Z_3$ as well as a(n) (initial) reflection factor $\Gamma_1, \Gamma_2, \Gamma_3$.

In this instance, the reflection factors $\Gamma_1, \Gamma_2, \Gamma_3$ each refer to the wave resistance of the corresponding section 32, 34, 36. For example, the first reflection factor $\Gamma_1$, results from the (initial) impedance $Z_1$ which is determined at the aperture 26 of the waveguide 22, looking in the direction of the object 12, and from the wave resistance of the free space.

If, in the first line section 32, the free space, a plane wave is supposed locally, the phase of the first reflection factor $\Gamma_1$ has a linear functional relationship to distance D in sections. With increasing distance D, a monotonously decreasing function results for the absolute value of the first reflection factor $\Gamma_1$.

The next line section 34 which corresponds to the waveguide 22 transforms the impedance $Z_1$ into the impedance $Z_2$.

The third (initial) reflection factor $\Gamma_3$ of the line section 36, the high-frequency line 18, which in turn results through a transformation from $Z_2$, is easily measurable.

A reflection factor corresponding to $P_1$ can be concluded by means of a conformal mapping 38 of the third reflection factor $\Gamma_2$, which is determined in the signal-processing arrangement 14, said reflection factor reflecting a measure for the distance D. The reflection factor $\Gamma$ is a complex quantity and is defined as a quotient of the reflection wave 30 and the transmission wave 16. The reflection factor $\Gamma_1$ can, for example, be determined by means of the following relationship according to a conformal mapping, wherein $Z_{ref}$ is a normalization impedance which can be determined in a rough calibration which is described later:

$$\Gamma_1 = \frac{Z_3 - Z_{ref}}{Z_3 + Z_{ref}}$$

where $Z_{ref} = a + jb$.

In order to be able to detect distances D which are as large as possible, according to an exemplary embodiment, as few evanescent contributions of the free space transmission wave 16c as possible are present in the region in front of the aperture 26 of the waveguide 22, as these quickly subside with increasing distance and, even at a short distance D, supply only a small contribution to the field distribution. According to the invention it is provided that the free space transmission wave 16c at least temporarily has a dominating contribution of a plane wave which propagates in the direction of the object 12 to determine the distance D.

The field distribution in the aperture 26 is predetermined by the wave mode distribution in the waveguide 22. A wave mode is therefore stimulated which explicitly leads predominantly to a free space transmission wave 16c which propagates in the direction of the object. The waveguide transmission wave 16b should therefore be transferred into the free field transmission wave 16c with as few reflections as possible at the aperture 26. For this purpose, the wave resistance of the waveguide wave mode must correspond as far as possible to the wave resistance of the free space and the field distribution thereof must correspond as far as possible to the one of a plane wave. These conditions can, for example, be fulfilled by the basic wave mode of a rectangular or circular cylindrical waveguide 22.

In accordance with the applicable standard for inductive proximity sensors, a circular cylindrical construction is predetermined. For an analogous application of the standard to the proximity sensor 10 according to the invention, this means that the waveguide 22 is preferably implemented as a circular cylindrical waveguide 22 having preferably a circular cross-section. Without considering the standard, which strictly speaking only applies to inductive proximity sensors, however, purely in principle a freely selectable other cross-section of the waveguide 22 can also be provided, for example a rectangular cross-section.

In FIGS. 2a-3b, two different field distributions are depicted, using the example of a circular cylindrical waveguide 22. In both examples, the field distributions result using a monomodal stimulation in the circular cylindrical waveguide 22.

Figure 2A:
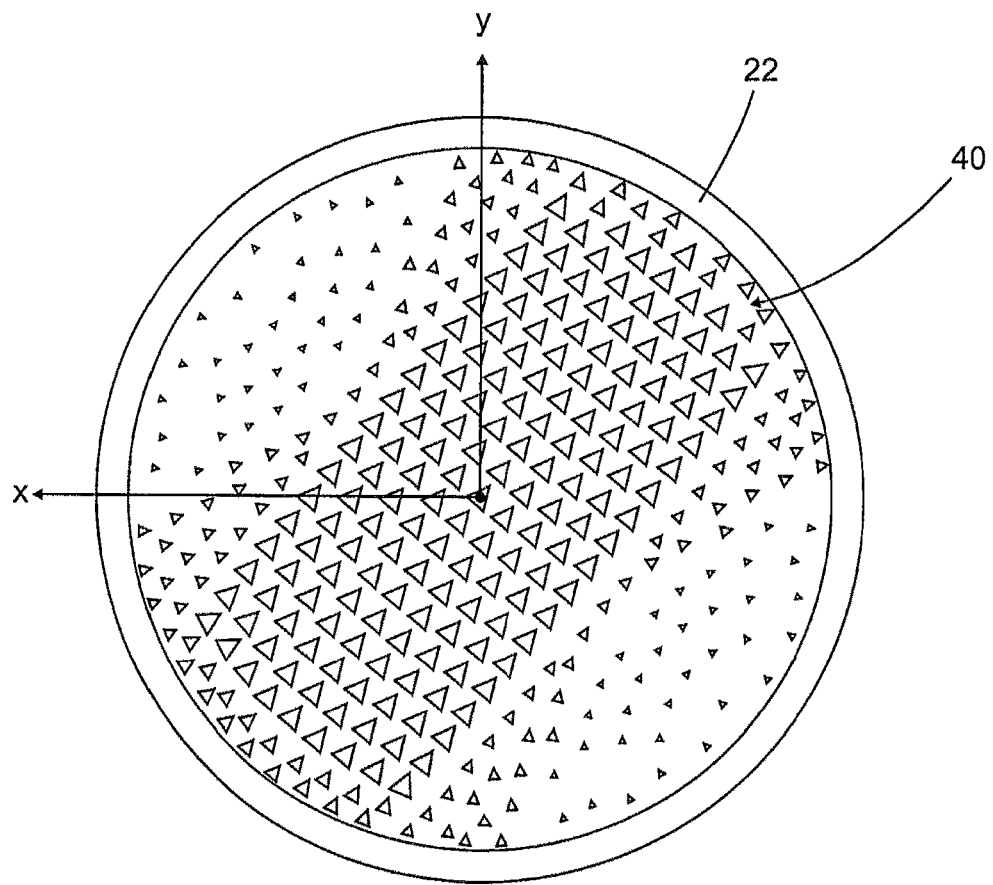

FIG. 2a shows a stimulation 40 in a TE11 mode allocated to a circular waveguide. In FIG. 2a, the electrical field strength 40 is outlined in a cross-section of the waveguide 22, the absolute value and direction of which are symbolised by the inscribed triangles.

Figure 2B:
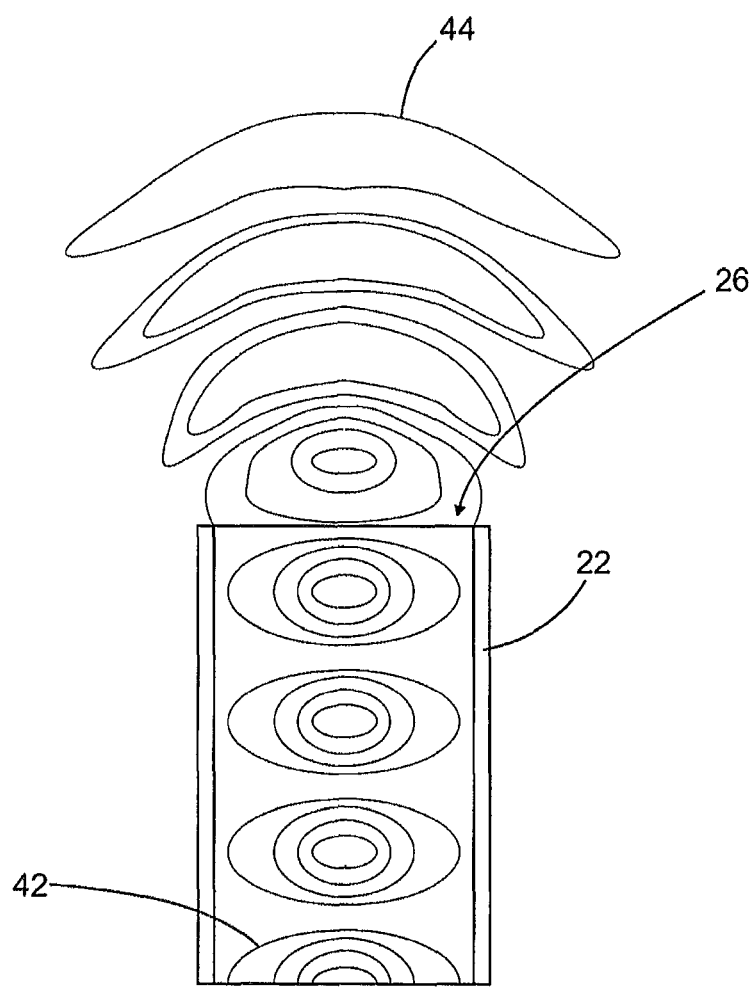

The corresponding field distribution 42 within the waveguide 22 and the field distribution 44 in the free space in front of the aperture 26 of the waveguide 22 are depicted in a top view in FIG. 2b. The stimulation in the TE11 mode leads predominantly to a desired free space transmission wave 16c which propagates in the direction of the object D. Such a propagating free space transmission wave 16c should at least temporarily be provided the proximity sensor 10 according to the invention.

FIG. 3a shows a second stimulation in a TM01 mode allocated to a circular waveguide. In FIG. 3a, the electrical field strength 46 in a cross-section of the waveguide 22 is outlined, the absolute value and direction of which are symbolised by the inscribed triangles.

The corresponding second field distribution 48 within the waveguide 22 and second field distribution 50 in the free space in front of the aperture 26 of the waveguide 22 are depicted in a top view in FIG. 3b. The stimulation in the TM01 mode leads to a predominantly evanescent field distribution 50 in the field space in front of the aperture 26.

The determination of the reflection factor $\Gamma$, specifically of the third reflection factor $\Gamma_3$, occurs in the signal-processing arrangement 14, the block diagram of which is shown in FIG. 4a.

Those parts shown in FIG. 4a which correspond to the parts shown in FIG. 1 are provided with the same reference numerals.

The signal-processing arrangement 14, the components of which can be arranged, according to an advantageous embodiment, in the rear end of the waveguide 22, contains a microwave oscillator 52, the output signal 54 of which is available both to a directional coupler 56 and to a quadrature mixer 58. The directional coupler 56 transfers the output signal 54 of the microwave oscillator 52 via the high frequency line 18 to the mode changer 20, Furthermore, the directional coupler 56 decouples the reflection wave 30 and transfers a reflection signal 60 corresponding to the reflection wave 30 to the quadrature mixer 58.

If necessary, a switch 62 is provided. The switch 62 enables the switching of a first frequency of the output signal 54 of the microwave oscillator 52 to at least one further frequency.

The transmission wave 16 is separated from the reflection wave 30 in the directional coupler 56. The directional coupler 56 can be implemented in planar line technology, for example in microstrip technology.

The reflection factor $\Gamma$, specifically the third reflection factor $\Gamma_3$, can be determined on the basis of the separate waves 16, 30, for example by means of quadrature mixing in the quadrature mixer 58.

A block diagram of the quadrature mixer 58 is shown in FIG. 4b. The quadrature mixer 58 forms an in-phase and a quadrature component, I, Q by mixing the reflection wave 30 with the transmission wave 16. The quadrature mixing enables the determination of a real and imaginary part of the complex envelope of the signal to be analysed, here of the reflection signal 60, with regard to the amplitude and phase of the reference signal, here the output signal 54.

The 6-gate technique offers an alternative possibility for determining the reflection factor $\Gamma$. An implementation example of the 6-gate technique is shown in FIG. 4c. The 6-gate technique also provides the in-phase and the quadrature components, I, Q.

A further alternative possibility to determine the reflection factor $\Gamma$ is possible in the scope of a measurement of the standing waveform along the line sections.

Both components, I, Q are supplied to a calculation unit 64, which determines from this the complex reflection factor $\Gamma$, specifically the third reflection factor $\Gamma_3$ and preferably undertakes a calibration which is described further below as well as a measured value evaluation.

The calculation unit 64 furthermore preferably contains the conformal mapping 38 for the transformation of the complex third reflection factor $\Gamma_3$ into the first complex reflection factor $\Gamma_1$. An output signal 66 of the calculation unit 64 can be evaluated directly as a measure for the distance D.

According to an advantageous embodiment of the proximity sensor 10 according to the invention, the microwave oscillator 52, the mode changer 20, the directional coupler 56, the quadrature mixer 58 as well as the calculation unit 64 are arranged on a single circuit board which is produced from a base material which is capable of handling high frequencies, for example glass fibre-reinforced Teflon.

Following the measurement principle, the conformal mapping 38 is provided which transforms the first reflection factor $\Gamma_1$ in the complex plane onto a spiral having the reference wave resistance as a central point, corresponding to a re-normalizing of the wave resistance. In this instance, all plane waves are composed in a dominating, propagating wave in the free space between the aperture 26 and the object 12. As this wave loses power due to loss and radiation, both the propagation constant thereof and the wave resistance thereof is complex, from which a complex reference wave resistance also ensues.

In the event of the reference wave resistance of the first reflection factor $\Gamma_1$ corresponding to the wave resistance of an equivalent line, the first reflection factor $\Gamma_1$ of a bypassed line in the complex plane describes a spiral which is passed through with increasing distance to the bypass in the direction of the interior of the spiral.

Without considering the further influences of the mode changer 20, the course of the third reflection factor $\Gamma_3$ describes a spiral in the complex reflection factor plane as a function of the distance D, the position of which results from the individual transformations. Although in principle a spiral-shaped course is still present, a complicated course can result from this for the third complex reflection factor $\Gamma_3$ in the usual polar coordinate depiction. For illustration, it is assumed in a simplified manner that the spiral lies completely in the first quadrant of the Cartesian reflection factor plane. Under this assumption, a value region of from 0 to $\pi/2$ ensues for the angle of the reflection factor $\Gamma_1$ in polar coordinates. From the phase course which previously decreased linearly with increasing distance D, a curve has now resulted which has phase values which increase in sections without phase jumps. Equally, different maxima and minima in the value of the reflection factor $\Gamma_3$ result from the transformations. Finally the goal of the conformal mapping 38 is to eliminate the influence of the impedance transformations by re-normalization, and therefore to displace the central point of the spiral-shaped course to the origin of the reflection factor plane.

In FIG. 5a, the absolute value of the third reflection factor $\Gamma_3$ is shown before the conformal mapping and in FIG. 6a after the conformal mapping.

In FIG. 5b, the phase Ph $\Gamma_1$ of the third reflection factor $\Gamma_3$ is shown before the conformal mapping and in FIG. 6b after the conformal mapping.

As can be recognised after the conformal mapping a monotonically decreasing function and a linear relationship between the distance D and the phase Ph $\Gamma_3$ results for the absolute value of the third reflection factor $\Gamma_3$.

In FIG. 7, the complex third reflection factor $\Gamma$, specifically the third reflection factor $\Gamma_3$, is shown in a Smith diagram, wherein two curve courses are shown, which apply for two different frequencies of the transmission wave 16, which can be periodically switched between by means of the switch 62.

The distance D from the object 12 can be decided from the linear phase course directly via the phase constants of the transmission wave 16. As can be seen in FIG. 7, due to the periodicity of the phase course Ph $\Gamma$, the correlation between the distance D and the phase Ph $\Gamma$ is initially not unambiguous if the detection region of the proximity sensor 10 exceeds half the wavelength of the transmission wave 16. In order to be able to also implement an unambiguous solution for a larger measurement range of the distance D, the absolute value course of the reflection factor $\Gamma$ is additionally evaluated and therefore the ambiguity of the pure phase evaluation is eliminated. This evaluation is successfully implemented, since the conformal mapping 38 transforms the absolute value of the determined first reflection factor $\Gamma_1$ to a monotonically decreasing course.

To implement the sensor concept, according to an advantageous embodiment, at least one rough calibration, preferably however a rough and a fine calibration, are provided.

In the case of the rough calibration, the normalization impedance:

$$Z_{ref}=a+jb$$

which is necessary for the conformal mapping:

$$\Gamma_1 = \frac{Z_3 - Z_{ref}}{Z_3 + Z_{ref}}$$

is determined. As a result of the rough calibration, $\Gamma_1$ describes a spiral around the origin of the complex reflection factor plane, whereupon a monotonically decreasing reflection factor absolute value and a virtually linearly decreasing phase, such as is shown in FIGS. 6a and 6b, is set. Although the phase runs apparently linearly, small deviations from this ideal course are virtually unavoidable. The goal of the preferably additionally provided fine calibration is, on the one hand, to approach these deviations through a polynomial which is subsequently provided to the measured value evaluation for error compensation. On the other hand, during the fine calibration, a polynomial description of $|\Gamma_1(D)|$ is developed with the aid of which the ambiguity of the phase measurement is eliminated.

The basis of both calibrations form measured values (reference values) of the complex reflection factor $\Gamma_3$, which are recorded and stored once after the sensor production along the detection region D. The number of the value pairs to be recorded is thereby mainly determined by the accuracy of the sensor to be achieved.

The rough calibration can, for example, be implemented as follows:

In order to be able to consider all parasitic influences along the line sections 36, 34, 32, no attempt is made to determine the normalization impedance analytically from the replacement circuit diagrams, but rather to obtain $Z_{ref}$ directly from the reference values of the produced sensors. Beginning with:

$$Z_{ref}=a+jb,$$

the conformal transformation is:

$$\Gamma_1 = \frac{Z_3 - a - jb}{Z_3 + a + jb}$$

wherein a and b are determined by an iterative process, such that $|\Gamma_1|$ decreases monotonically with increasing distance D.

For this purpose, $|\Gamma_1(D)|$ is considered as a function of D with the two parameters a and b. The requirement of monotony is synonymous with the disappearance of the local maxima of $|\Gamma_1(D)|$. The k positions $D_i \neq 0$, at which this function takes on its maxima, can be found by means of:

$$\frac{d|\Gamma_1(D_i)|}{dD} = 0$$

and the condition:

$$\frac{d^2|\Gamma_1(D_i)|}{dD^2} < 0.$$

The goal of the numerical optimisation process is now to determine a and b in such a way that $|\Gamma_1 D_1|$ becomes minimal and ideally k=0 ensues.

As a starting value of the iteration, it is offered to select:

$$Z_{ref}=\lim_{D \to \infty}(Z_3)$$

and thereby to calculate $|\Gamma_1|$.

According to one embodiment, it is provided to design the mode changer 20 in such a way that this carries out an impedance transformation of $Z_1$ directly, whereby the conformal mapping can be greatly simplified or can even be omitted entirely.

The preferably additionally provided fine calibration can, for example, be carried out as follows:

In the first step of the fine calibration, an interpolation polynomial for the function $|\Gamma_1(D)|$ is developed, the degree of which determines the quality of the approximation. The degree of the polynomial is limited in turn by the number of development points which here are the measured reference points. As, however, any number of points can be recorded in terms of measurement, an interpolation polynomial for any accuracy can also be found. The purpose of this polynomial is to carry out a rough measurement of the distance D via the measured absolute value of the reflection factor $\Gamma$. This measurement only serves to determine the correct interval of the phase.

The non-linearity which occurs in practice in the phase course despite the conformal mapping directly affects the accuracy to be expected for the determination of the distance D. To reduce the measurement error, therefore, a subsequent linearization is preferably carried out for the determination of the distance D.

Starting from the phase course of the reflection factor $\Gamma$ according to the conformal mapping, the discontinuous phase course is transferred to a continuous and unambiguous function with the aid of $|\Gamma|$. The phase values at the individual reference positions are determined by the sensor evaluation and the difference between the actual and nominal value is determined. All deviations of the phase along the detection region are represented again by a polynomial. Also here, a degree of any size and therefore any accuracy can be achieved by any number of measurement points.

If the polynomial is determined and stored, the deviation for the exact phase can be determined from this for the actual determination of the distance D and the measurement result can be corrected.

At this point, it is again indicated that the parameters required for the calibration are determined only once after the production of the proximity sensor 10 according to the invention and are deposited in a memory which is not shown in more detail in FIG. 4. The proximity sensor 10 according to the invention provides a measure for absolute distances D and does not require a reference during the operation.

According to one development of the proximity sensor 10 according to the invention or the method according to the invention for measuring the distance D from an object 12 respectively, it is provided to determine the reflection factor $\Gamma$ and therefore the distance D for at least two different frequencies instead of for a predetermined frequency of the microwave oscillator 54. To switch between the frequencies, the switch 62 is provided which initiates the microwave oscillator 52 alternatingly for the provision of the output signal 54 having the first and having the at least one further frequency. As is already explained in connection with FIG. 7, for a correct, conformal mapping 38 of the reflection factor $\Gamma$ further spiral-shaped courses 68, 70 result for further frequencies. Therefore, theoretically, an increasing phase difference Ph $\Gamma$, from which the clarity can be obtained, ensues from the evaluation for two different frequencies in the case of increasing distance D of the object 12. This embodiment is in particular advantageous for large distances D, as here the course of the absolute value of the reflection factor $\Gamma$ is flatter and therefore the determination thereof is possibly more prone to error.

In principle, using the measurement of the distance D with two different frequencies and with only one wave mode, a checking of plausibility or verification of the determined distance D is possible.

A further advantageous development provides that instead of monomodal stimulation, further wave modes are additionally generated in the waveguide 22 and the reflection factor $\Gamma$ is determined for the different wave modes. Thereby, at least one further independent complex value is obtained which can be used to determine the distance D and/or to eliminate the ambiguity in the phase Ph $\Gamma$. For this development, several mode changers 20 are required.

A checking of plausibility or verification of the determined distance D is also hereby possible.

If necessary, to determine the distance D, both at least two different frequencies of the transmission wave 16 and at least two different wave modes can be used.

The determined measure for the distance D corresponding to the output signal 66 can be provided as an analogue signal. Alternatively or additionally, the output signal 66 can be provided as a switch signal, which signals that a determined distance D has been exceeded or fallen below.

The invention claimed is:

1. Proximity sensor for measuring the distance (D) from an object, comprising:
   a microwave oscillator which provides a transmission wave as an output signal, which the proximity sensor emits in the direction of the object as a free space transmission wave which the object, which is electrically conductive or at least has an electrically conductive surface, reflects as a free space reflection wave and the proximity sensor receives as a reflection wave,
   wherein a determination of the reflection factor ($\Gamma$) from the transmission wave and the reflection wave is provided, which the proximity sensor provides as a measure for the distance (D),
   wherein the transmission wave is guided in a waveguide as a waveguide transmission wave,
   wherein the injection of the transmission wave into the waveguide is provided with a wave mode which leads to the separation of the waveguide transmission wave at the aperture at the front end of the waveguide into the free space transmission wave and to the propagation of the free space transmission wave towards the object.

2. Proximity sensor according to claim 1, wherein the TE11 mode is provided as a wave mode when a circular waveguide is used.

3. Proximity sensor according to claim 1, wherein the waveguide is designed to be circular cylindrical.

4. Proximity sensor according to claim 1, wherein a dielectric window is provided at the aperture at the front end of the waveguide.

5. Proximity sensor according to claim 1, wherein the waveguide is filled with a dielectric material.

6. Proximity sensor according to claim 1, wherein at least one mode changer is provided for the determination of the wave mode of the waveguide transmission wave in the waveguide.

7. Proximity sensor according to claim 1, wherein a quadrature mixer is provided for the determination of the reflection factor ($\Gamma$) from the transmission wave and the reflection wave.

8. Proximity sensor according to claim 1, wherein a 6-gate technique is provided for the determination of the reflection factor ($\Gamma$) from the transmission wave and the reflection wave.

9. Proximity sensor according to claim 6, wherein the waveguide, the at least one mode changer and a signal-processing arrangement form a single-part unit, and wherein the at least one mode changer and the signal-processing arrangement are located at a rear end of the waveguide so that the waveguide transmission wave travels in a path that is free towards an open front end of the waveguide.

10. Method for the measurement of the distance (D) from an object, comprising:
- providing an output signal of a microwave oscillator as a transmission wave which is emitted in the direction of the object as a free space transmission wave which is reflected by the object, which is electrically conductive or at least has an electrically conductive surface, as a free space reflection wave and is received as a reflection wave, wherein the reflection factor ($\Gamma$) is determined from the transmission wave and the reflection wave and is provided as a measure for the distance (D),
- guiding the transmission wave in a waveguide as a waveguide transmission wave, and
- carrying out the injection of the transmission wave into the waveguide with a wave mode which leads to the separation of the waveguide transmission wave into the free space transmission wave at the aperture at the front end of the waveguide and to the propagation of the free space transmission wave towards the object.

11. Method according to claim 10, wherein the TE11 mode is provided as a wave mode when a circular waveguide is used.

12. Method according to claim 10, wherein the determination of the distance (D) is carried out for one frequency of the transmission wave and one wave mode.

13. Method according to claim 10, wherein, to determine the distance (D), a tuning of the microwave oscillator is carried out alternatingly to at least two different frequencies of the transmission wave and wherein the determination of the distance (D) is carried out for at least two different frequencies as well as a wave mode.

14. Method according to claim 10, wherein at least one second wave mode is provided for the injection of the transmission wave into the waveguide alternatingly with respect to the first waveguide.

15. Method according to claim 10, wherein the determination of the distance (D) is carried out for one frequency of the transmission wave and at least for two different wave modes.

16. Method according to claim 10, wherein such a further wave mode is provided which leads to a predominantly evanescent field distribution in front of the waveguide.

17. Method according to claim 16, wherein in the case of use of a circular waveguide, the TM01 mode is provided as at least one further wave mode.

18. Method according to claim 13, wherein the determination of the distance (D) is carried out in at least two different ways.

19. Method according to claim 10, wherein a determination of a phase (Ph $\Gamma$) of the reflection factor ($\Gamma$) is provided as a measure for the distance (D).

20. Method according to claim 10, wherein a determination of a phase (Ph $\Gamma$) and of the absolute value |$\Gamma$| of the reflection factor ($\Gamma$) is provided as a measure for the distance (D).

21. Method according to claim 20, wherein an unambiguous determination of the distance (D) from the phase (Ph $\Gamma$) of the reflection factor ($\Gamma$) is provided by the absolute value of the reflection factor ($\Gamma$), if ambiguity of the phase (Ph $\Gamma$) of the reflection factor ($\Gamma$) is present within a predetermined measurement range.

22. Method according to claim 10, wherein a rough calibration is carried out to determine a normalization impedance.

23. Method according to claim 22, wherein a fine calibration is carried out after the rough calibration to determine the normalization impedance, wherein the fine calibration comprises developing an interpolation polynomial for the function |$\Gamma$ (D)| and subsequently carrying out a linearization for the determination of the distance.

24. Method according to claim 10, wherein the distance (D) is provided as an analogue signal.

25. Method according to claim 10, wherein a switch signal is provided which signals that a determined distance (D) is exceeded or fallen below a selected threshold distance.

26. Method according to claim 18, wherein the determination of the distance (D) is carried out by using a plurality of different frequencies of the transmission wave.

27. Method according to claim 18, wherein the determination of the distance (D) is carried by out by using at least two different wave modes of the transmission wave.

* * * * *